July 4, 1939.  C. A. RICH ET AL  2,164,942
MEASUREMENT OF FRUSTOCONICAL PARTS
Filed Sept. 20, 1937    2 Sheets-Sheet 1
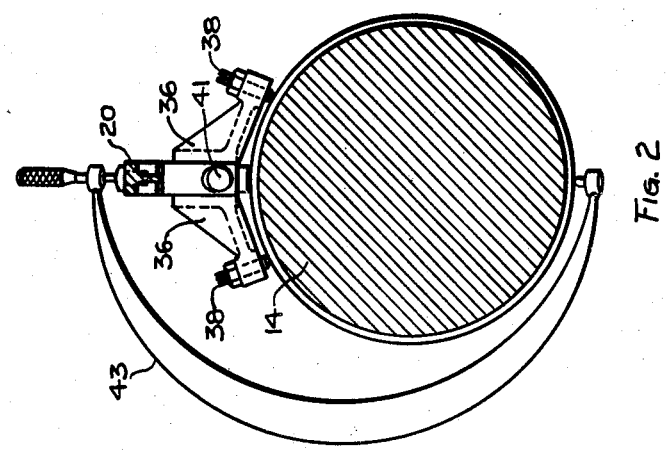
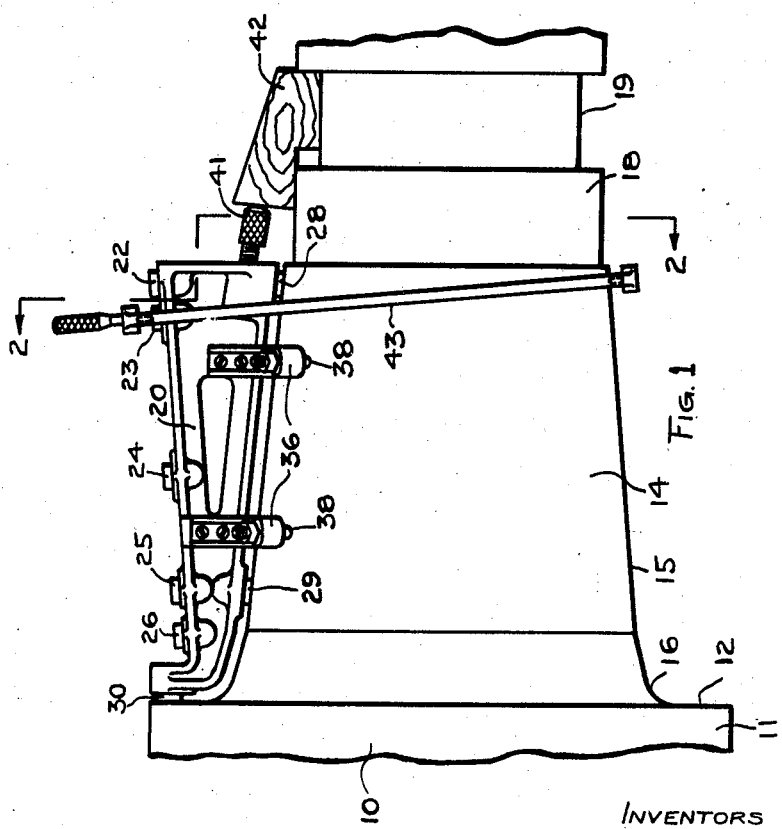
INVENTORS
CHARLES A. RICH
CHARLES PALMER
By Albert G. Blodgett
ATTORNEY July 4, 1939.  C. A. RICH ET AL  2,164,942

MEASUREMENT OF FRUSTOCONICAL PARTS

Filed Sept. 20, 1937  2 Sheets-Sheet 2

INVENTORS
CHARLES A. RICH
CHARLES PALMER

By Albert G. Blodgett
ATTORNEY

Patented July 4, 1939

2,164,942

UNITED STATES PATENT OFFICE 2,164,942

MEASUREMENT OF FRUSTOCONICAL PARTS

Charles A. Rich and Charles Palmer, Worcester, Mass., assignors to Morgan Construction Company, Worcester, Mass., a corporation of Massachusetts Application September 20, 1937, Serial No. 164,715

6 Claims. (Cl. 33—174)

This invention relates to the measurement of frusto-conical parts, such as the tapered necks of rolls used in the rolling of metal, and more particularly to the construction of a novel gauge for this purpose.

These roll necks must be finished with great accuracy in order that the supporting bearings may fit properly thereon. Heretofore it has been the practice to utilize ring-shaped gauges in the measurement of tapered roll necks, but such gauges are inconvenient to use and they do not furnish an accurate indication of the extent to which a particular roll neck varies from the correct size. Furthermore, the rolls are often of great size and weight, and ring-shaped gauges of the requisite size are very difficult and expensive to manufacture. In the larger sizes such gauges are so heavy as to require hoists or cranes to handle them in use.

It is accordingly one object of the invention to provide a comparatively simple and inexpensive gauge for use in the measurement of frusto-conical parts, and particularly to provide a gauge of this character which will be relatively light and easy to use even in large sizes.

It is a further object of the invention to provide a gauge for frusto-conical parts which will make it possible for a workman to ascertain readily and with great accuracy the amount of stock which he must remove from the frusto-conical surface in order to bring it to the correct dimensions.

It is a further object of the invention to provide a gauge for frusto-conical parts which will be inexpensive to manufacture and which can be easily checked for accuracy.

With these and other objects in view, as will be apparent to those skilled in the art, the invention resides in the combination of parts set forth in the specification and covered by the claims appended hereto.

In accordance with the invention in its preferred form we provide a gauge having surfaces which define two planes diverging at an angle equal to the angle desired for the frusto-conical part to be measured, and a further surface extending transversely of the diverging planes and adapted to locate the gauge accurately with respect to the frusto-conical part in a direction axial thereof. The gauge preferably comprises a frame having a plurality of comparatively small blocks secured thereto to form the actual gauging surfaces, these blocks being of a suitable wear-resisting material. The frame may be provided with two pairs of arms which project laterally from opposite sides of the frame, these arms having means at their outer ends to aid in positioning the gauge in accurate alignment with an element of the frusto-conical surface. In measuring a roll neck or other part, the gauge is placed in contact with an element of the frusto-conical surface, with the said two planes diverging in a direction opposite to that in which the elements of the frusto-conical surface diverge, the transverse gauging surface engaging a shoulder on the roll. The distance between the outer gauging surface and the diametrically opposite element of the frusto-conical surface is then measured at a plurality of points by using outside micrometer calipers or other suitable means. Any variation in these several measurements will indicate the extent by which the roll neck varies from the correct taper. Moreover, the extent by which these several measurements differ from a predetermined value, previously ascertained by calculation, will indicate the amount of stock, if any, which must be removed from the roll neck to bring it to the correct size.

Referring to the drawings illustrating one embodiment of the invention and in which like reference numerals indicate like parts, Fig. 1 is a side elevation of a gauge and micrometer calipers applied to a roll neck to measure the same;

Fig. 2 is a section on the line 2—2 of Fig. 1;

Figure 4:
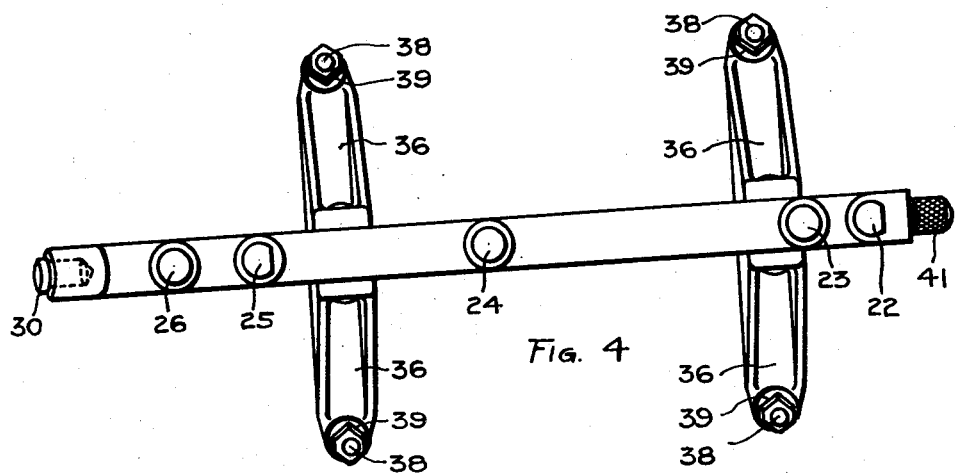
Fig. 4 is a plan view of the gauge, taken on the line 4—4 of Fig. 3.

In Fig. 1 of the drawings there is shown a portion of a rolling mill roll 10 comprising a cylindrical barrel 11 having a shoulder 12 at its end, and a roll neck 14 coaxial with the barrel. The roll neck is formed in part with a frusto-conical or tapered outer surface 15, the inner or larger end of this surface being connected to the shoulder 12 by means of a fillet portion 16. The outer portion 18 of the roll neck is somewhat reduced in diameter and provided with a circumferential groove 19, which may be used to secure a bearing (not shown) to the roll neck. The present invention provides a gauge for use in measuring the frusto-conical surface 15.

Figure 3:
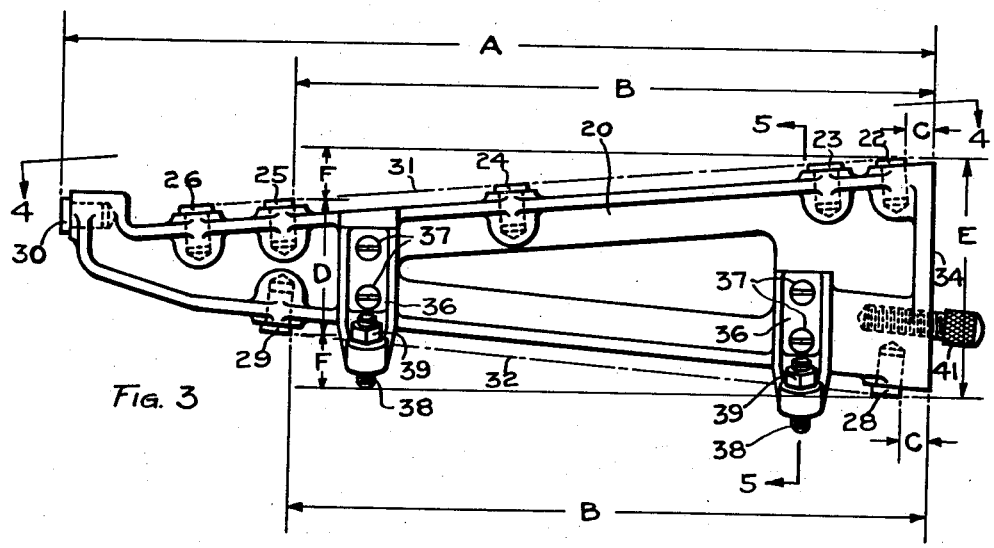
Fig. 3 is an enlarged side elevation of the gauge.
Figure 5:
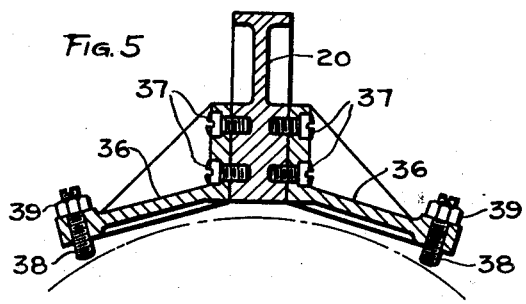
Fig. 5 is a section on the line 5—5 of Fig. 3.

As shown particularly in Fig. 3, our improved gauge comprises a frame 20 which is generally wedge-shaped or triangular in side elevation. This frame may be formed of a comparatively inexpensive material, such as cast iron, having the requisite strength and rigidity. The frame serves to support a plurality of small blocks or projecting bosses of a suitable wear-resisting material, such as hardened steel, which form the actual gauging surfaces. These steel blocks may be in the form of pins or plugs forced into openings in the frame and provided with enlarged heads at their outer ends. In the embodiment illustrated there are five of these plugs arranged along the upper edge of the frame 20 and identified by the reference numerals 22, 23, 24, 25 and 26. Along the lower edge of the frame there are two plugs 28 and 29, located directly opposite the plugs 22 and 25 respectively. At the inner or narrow end of the frame there is provided a single plug 30. The plugs 22, 23, 24, 25 and 26 of the upper row have their upper exposed ends located in a common plane indicated by the broken line 31, and the plugs 28 and 29 of the lower row have their lower exposed ends located in a common plane indicated by the broken line 32. These planes 31 and 32 diverge at an angle equal to the angle desired for the frusto-conical surface 15 of the roll neck 14.

In order to obtain the desired accuracy in the manufacture of the gauge, we recommend that the several plugs be inserted in the frame with their ends projecting outwardly slightly beyond the correct planes. The surface 34 at the wide end of the frame is accurately finished by grinding or otherwise, and the end of the single plug 30 is then ground parallel to the surface 34 and at predetermined distance A therefrom. The plugs 25 and 29 are then ground, on their sides toward the wide end of the gauge, parallel to the surface 34 and at a predetermined distance B therefrom. Similarly, the plugs 22 and 28 are ground, on their sides toward the wide end of the gauge, parallel to the surface 34 and at a predetermined distance C therefrom. The two rows of plugs are then ground to bring their exposed ends into the planes 31 and 32 respectively, these planes making equal angles with the surface 34, the grinding being continued until a micrometer measurement across the plugs 25 and 29 indicates a predetermined dimension D, and a micrometer measurement across the plugs 22 and 28 indicates a predetermined dimension E. The two dimensions F may be readily checked by the use of standard gauge blocks. It will be understood that these several lettered dimensions can be readily predetermined in any particular case to provide a gauge of the correct size for a roll neck of a given design. The plug 30 provides a surface in a plane transverse to the planes 31 and 32 and at a predetermined distance from the line of intersection of these planes.

In measuring the roll neck, the gauge is so placed that the plugs 28 and 29 contact with one element of the frusto-conical surface 15, and the plug 30 contacts with the shoulder 12. In order to assist in the correct placing of the gauge, the gauge is preferably provided with two spaced pairs of laterally projecting arms 36 which are attached at their inner ends to the frame 20 by means of screws 37. Each arm 36 is provided at its outer end with an adjustable screw 38 and a lock nut 39. These screws 38 are so adjusted that their inner ends will be spaced a few thousandths of an inch from the frusto-conical surface 15 when the gauge is properly positioned thereon. At the wide or outer end of the frame 20 there is provided a knurled screw 41 which can be adjusted outwardly into engagement with a block 42 of wood or other suitable material, which is placed in the groove 19 of the roll neck, as shown in Fig. 1. In this manner the gauge can be held lightly yet firmly in position. It will be apparent that an outside micrometer caliper 43 or other suitable device can now be used to ascertain the distances from the upper ends of the plugs 23, 24 and 26 to the diametrically opposite element of the frusto-conical surface, and if the angle of taper is correct these distances will all be the same. Furthermore, the extent whereby this distance exceeds a predetermined dimension will indicate the amount of stock which must be removed from the frusto-conical surface 15 to bring it to the correct size. This predetermined dimension may be made an exact number of inches or other units, by selection of properly calculated values for the dimensions D and E of the gauge. This will reduce the possibility of error in the use of the gauge through misreading of the micrometer caliper 43.

It will now be apparent that we have disclosed a comparatively simple and inexpensive gauge which can be manufactured with great accuracy, and which is light enough to be readily handled even when constructed for use with very large rolls. This gauge provides a novel and highly useful means for measuring frusto-conical surfaces, and in conjunction with a micrometer caliper it affords an accurate indication of the extent of any deviation from the correct size and shape. In the use of the gauge, measurements are taken at a plurality of points along its length, but these measurements should all be the same, and hence only one micrometer caliper need be utilized.

Having thus described our invention, what we claim as new and desire to secure by Letters Patent is:

1. A gauge for use, in conjunction with an outside micrometer caliper or similar device, for measuring a frusto-conical part having a shoulder connected therewith comprising a structure having portions providing surfaces which define two planes diverging at an angle equal to the angle desired for the frusto-conical part, said portions being located between said planes, the structure being adapted to be placed against one element of the frusto-conical surface with the said two planes diverging in a direction opposite to that in which the elements of the frusto-conical surface diverge, the structure also having means providing a further surface in a plane transverse to the diverging planes and at a predetermined distance from the line of intersection of the diverging planes, the said further surface being adapted to engage the shoulder and thus locate the gauge accurately with respect to the frusto-conical part in a direction axial thereof.

2. A gauge for use, in conjunction with an outside micrometer caliper or similar device, for measuring a frusto-conical part having a shoulder connected therewith comprising a wedge-shaped structure having portions providing surfaces which define two planes diverging at an angle equal to the angle desired for the frusto-conical part and located on opposite sides of said structure, the structure being adapted to be placed against one element of the frusto-conical surface with the smaller end of the structure adjacent the larger end of the frusto-conical part, and means connected to the structure and providing a further surface in a plane transverse to the diverging planes and at a predetermined distance from the line of intersection of the diverging planes, the said further surface being adapted to engage the shoulder and thus locate the gauge accurately with respect to the frusto-conical part in a direction axial thereof.

3. A gauge for use, in conjunction with an outside micrometer caliper or similar device, for measuring a frusto-conical part having a shoulder connected therewith comprising a frame having a plurality of bosses projecting outwardly from opposite sides thereof with accurately finished outer surfaces which define two planes diverging at an angle equal to the angle desired for the frusto-conical part, the bosses on one side of the frame being adapted to engage one element of the frusto-conical surface with the said two planes diverging in a direction opposite to that in which the elements of the frusto-conical surface diverge, and means connected to the frame and providing a locating surface in a plane transverse to the diverging planes and at a predetermined distance from the line of intersection of the diverging planes, the said locating surface being adapted to engage the shoulder and thus position the gauge accurately with respect to the frusto-conical part in a direction axial thereof.

4. A gauge for use, in conjunction with an outside micrometer caliper or similar device, for measuring a frusto-conical part having a shoulder connected therewith comprising a frame, a plurality of blocks of hard wear-resisting material mounted on opposite sides of the frame and having accurately finished plane outer surfaces which define two planes diverging at an angle equal to the angle desired for the frusto-conical part, the blocks being located between said planes, the blocks on one side of the frame being adapted to engage one element of the frusto-conical surface with the said two planes diverging in a direction opposite to that in which the elements of the frusto-conical surface diverge, and an additional block of hard wear-resisting material mounted on the frame to provide a locating surface in a plane tranverse to the diverging planes and at a predetermined distance from the line of intersection of the diverging planes, the said locating surface being adapted to engage the shoulder and thus position the gauge accurately with respect to the frusto-conical part in a direction axial thereof.

5. A gauge for use, in conjunction with an outside micrometer caliper or similar device, for measuring a frusto-conical part having a shoulder connected therewith comprising a wedge-shaped frame having a plane measuring surface at its wide end, a plurality of bosses projecting outwardly from opposite sides of the frame with accurately finished plane outer surfaces which define two planes diverging at an angle equal to the angle desired for the frusto-conical part, the sides of the bosses toward the wide end of the frame being accurately finished to predetermined dimensions from the said measuring surface, and a boss projecting from the narrow end of the frame to provide a locating surface at a predetermined distance from said measuring surface, the said locating surface being adapted to engage the shoulder and position the gauge accurately on the frusto-conical part in a direction axial thereof.

6. A gauge for use, in conjunction with an outside micrometer caliper or similar device, for measuring a frusto-conical part having a shoulder connected therewith comprising a wedge-shaped structure having portions providing surfaces which define two planes diverging at an angle equal to the angle desired for the frusto-conical part and located on opposite sides of said structure, the structure being adapted to be placed against one element of the frusto-conical surface with the smaller end of the structure adjacent the larger end of the frusto-conical part, means connected to the structure and providing a further surface in a plane transverse to the diverging planes and at a predetermined distance from the line of intersection of the diverging planes, the said further surface being adapted to engage the shoulder and thus locate the gauge accurately with respect to the frusto-conical part in a direction axial thereof, and two pairs of spaced arms extending laterally from opposite sides of said structure with their end portions adapted for location in close proximity to the frusto-conical surface when the gauge is correctly aligned therewith.

CHARLES A. RICH.
CHARLES PALMER.